US008128071B2

(12) United States Patent
Laslo

(10) Patent No.: US 8,128,071 B2
(45) Date of Patent: Mar. 6, 2012

(54) METHOD AND APPARATUS FOR IMPROVED GAS/FLUID CONTACT

(75) Inventor: Dennis J. Laslo, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 1043 days.

(21) Appl. No.: 11/543,374

(22) Filed: Oct. 3, 2006

(65) Prior Publication Data

US 2008/0079181 A1 Apr. 3, 2008

(51) Int. Cl.
*B01F 3/04* (2006.01)
(52) U.S. Cl. .......................... 261/113; 261/116; 261/117
(58) Field of Classification Search .................. 261/115, 261/116, 117, DIG. 75, 113, 111
See application file for complete search history.

(56) References Cited

U.S. PATENT DOCUMENTS

| 968,332 | A | * | 8/1910 | Dow .............................. 261/146 |
| 992,081 | A | * | 5/1911 | Tait ................................. 261/76 |
| 1,658,533 | A | | 1/1927 | Mart | |
| 1,964,357 | A | | 6/1934 | Ketterer | |
| 2,284,317 | A | * | 5/1942 | Greenberg ....................... 95/216 |
| 2,523,441 | A | | 9/1950 | McKamy | |
| 3,225,522 | A | | 12/1965 | Black | |
| 3,957,465 | A | | 5/1976 | Pircon | |
| 4,067,707 | A | * | 1/1978 | Atsukawa et al. ............... 96/228 |
| 4,263,021 | A | | 4/1981 | Downs et al. ..................... 55/73 |
| 4,285,703 | A | * | 8/1981 | Alexander ....................... 96/240 |
| 4,312,646 | A | * | 1/1982 | Fattinger et al. ................. 96/239 |
| 4,464,309 | A | * | 8/1984 | Linhardt ....................... 261/23.1 |
| 4,744,958 | A | * | 5/1988 | Pircon .............................. 422/193 |
| 5,246,471 | A | * | 9/1993 | Bhat et al. ................... 423/242.3 |
| 5,279,646 | A | * | 1/1994 | Schwab ............................ 95/201 |
| 5,281,402 | A | | 1/1994 | Gohara et al. ................. 423/210 |
| 5,527,496 | A | | 6/1996 | Rogers et al. ................. 261/111 |
| 5,639,286 | A | * | 6/1997 | Chen et al. ....................... 96/275 |
| 6,227,524 | B1 | | 5/2001 | Kiselev et al. ............... 261/79.2 |
| 6,550,751 | B1 | | 4/2003 | Brown et al. .................. 261/113 |

FOREIGN PATENT DOCUMENTS

| DE | 1274559 | | 8/1968 |
| JP | 52-1575 | * | 1/1977 |
| WO | WO98/33576 | | 8/1998 |

OTHER PUBLICATIONS

PCT International Search Report dated Jan. 2, 2008—(PCT/US2007/077848).
Written Opinion of the International Search Authority dated Jan. 2, 2008—(PCT/US2007/077848).

* cited by examiner

*Primary Examiner* — Charles Bushey
(74) *Attorney, Agent, or Firm* — Wiggin and Dana LLP; Anthony P. Gangemi

(57) ABSTRACT

A spray tower (20) for improving contact between a gas stream (22) and a fluid (24). The spray tower (20) includes a tank (26) having an inlet (32) and an outlet (34), and a plurality of spray nozzles (28) positioned in the tank, each of the plurality of spray nozzles including a spray outlet (38). Each of the plurality of spray nozzles (28) is adapted to spray a cone (40) of the fluid (24) through the spray outlet (38) into the tank (26). The spray tower (20) also includes a perforated plate (30) having a plurality of perforations (44). The perforated plate (30) is positioned in the tank (26) so as to define a cross-section of the tank and each of the plurality of perforations (44) is aligned with the cone (40) flowing from the spray outlet (38) of one of the spray nozzles.

9 Claims, 6 Drawing Sheets

METHOD AND APPARATUS FOR IMPROVED GAS/FLUID CONTACT

BACKGROUND OF THE INVENTION (1) Field of the Invention

The present invention generally relates to a spray tower for improving contact between a gas stream and a fluid such as a liquid, slurry, or the like. In particular, the present invention is directed to perforated plate covering a cross-section of the spray tower that is aligned with spray nozzles thereby forcing gas into the dense stream of the fluid.

(2) Description of the Related Art

Generally, open spray towers can be used for heat exchange purposes, for the removal of entrained solids and/or liquids in a gas, or for chemical interchanges. One form of a gas and fluid contact system is used for the removal of acid gases such as sulfur dioxide, hydrogen chloride, hydrogen fluoride from flue gases. Typically, the fluid selected is a fluid of limestone and gypsum, or the like, which is sprayed through multiple levels of spray nozzles, thereby providing contact with the acidic flue gas.

In the case of calcium-based flue gas desulfurization, such as limestone slurry scrubbing, there is a fixed dissolved alkalinity in the sprayed slurry, which is depleted rapidly. After depletion, the drops no longer scrub $SO_2$ or scrub it slowly. Spray nozzles are typically arranged in a manner to cover a portion of the area of the spray tower. A portion of the gas contacts the slurry and reacts. However, there is much gas that only contacts a depleted spray and therefore no, or only a slight reaction, occurs.

Generally, the spray nozzles are arranged so that the sprays overlap to cover a larger area. Still, much of the gas does not contact the spray. One way maldistribution is reduced is by using a custom spray integrated into the tray and support structure or by disturbing stratification at the wall of the absorber. Also, typical practice to improve gas liquid distribution is to stagger nozzle layout, such that nozzles are not in vertical alignment, therefore covering a larger area. However, these methods still do not show great improvement in the area of maldistribution.

BRIEF SUMMARY OF THE INVENTION

One aspect of the present invention is a spray tower for improving contact between a gas stream and a fluid. The spray tower includes a tank having an inlet and an outlet. The gas stream flows between the inlet and the outlet along a flow path and in a main direction. The spray tower also includes a plurality of spray nozzles positioned in the tank. Each of the plurality of spray nozzles includes a spray outlet and each of the plurality of spray nozzles is adapted to spray a cone of the fluid through the spray outlet into the tank. The spray tower also includes a perforated plate having a plurality of perforations. The perforated plate is positioned in the tank so as to define a cross-section of the tank and the perforated plate is positioned so that each of the plurality of perforations is aligned with the cone flowing from the spray outlet of one of the plurality of spray nozzles.

Another aspect of the present invention is a perforated plate for improving contact between a gas stream and a fluid flowing in a spray tower. The spray tower includes a tank and spray nozzles for distributing a cone of the fluid. The perforated plate includes a plate adapted to cover a cross-section of the spray tower. The plate has a plurality of perforations, each of which is configured to be aligned with the cone flowing from one of the spray nozzles.

Another aspect of the present invention is a method of improving contact between a gas stream and a fluid. The method includes the following: directing the gas stream into a tank; positioning a plurality of spray nozzles in the tank, each of the plurality of spray nozzles including a spray outlet, wherein each of the plurality of spray nozzles is adapted to spray a cone of the fluid through the spray outlet into the tank; positioning a perforated plate having a plurality of perforations in the tank so that each of the plurality of perforations is substantially concentrically aligned with the cone flowing from the spray outlet of one of the plurality of spray nozzles; and spraying the fluid through the plurality of spray nozzles and into the tank.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
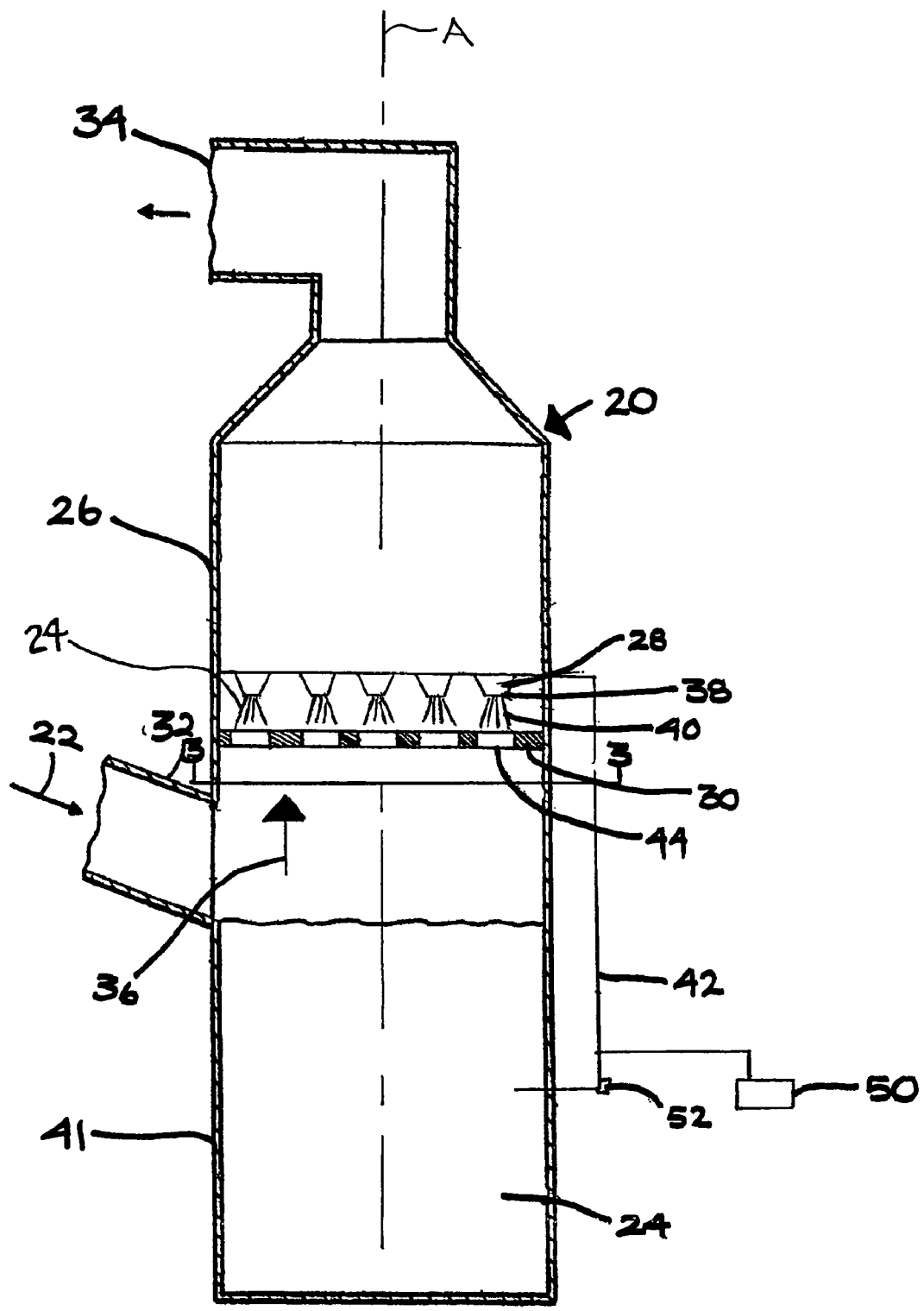
FIG. 1 is a cross-sectional view of a spray tower according to one embodiment of the present invention.
Figure 2:
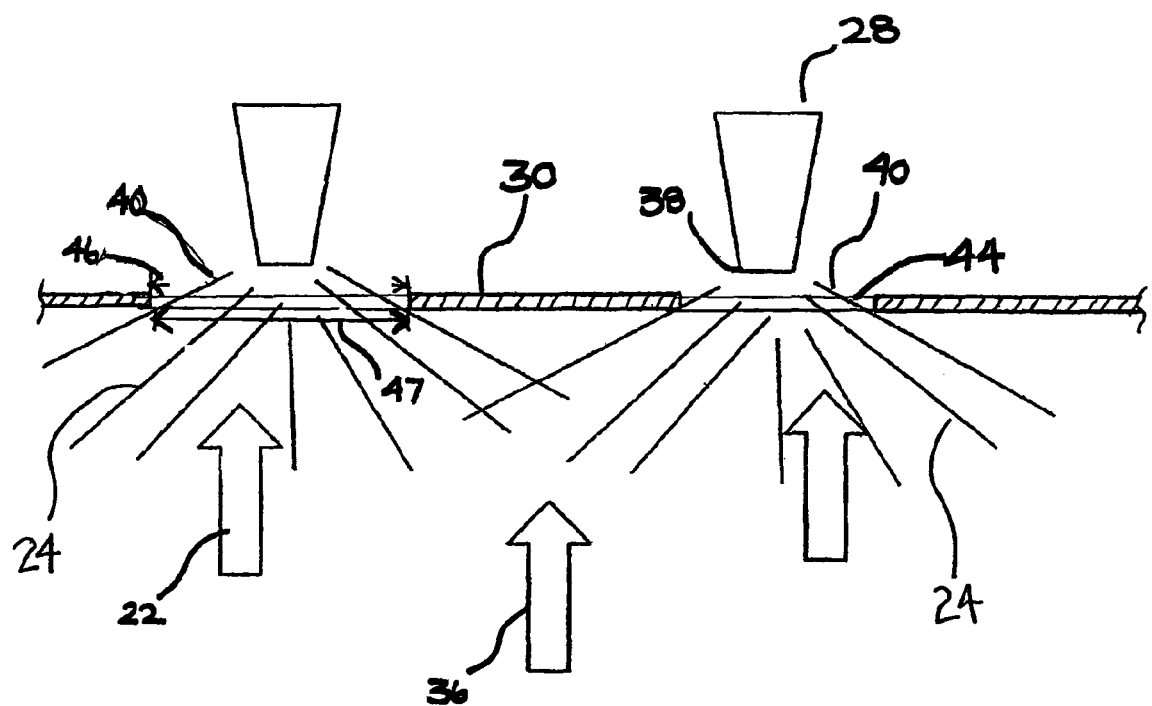
FIG. 2 is an enlarged partial cross-sectional view of one embodiment of the present invention.

Referring now to the drawings in which like reference numerals indicate like parts, and in particular, to FIGS. 1 and 2, one aspect of the present invention is a spray tower 20 for improving contact between a gas stream 22 and a fluid 24 such as a liquid, slurry, or the like. Spray tower 20 generally includes a tank 26, a plurality of spray nozzles 28, and a perforated plate 30.

Tank 26 includes an inlet 32 and an outlet 34. Gas stream 22 flows into tank 26 via inlet 32, flows through the tank along flow path 36 in a main direction, and exits the tank via outlet 34. A plurality of spray nozzles 28 are positioned in tank 26. Spray nozzles 28 may be grouped at one or more levels in tank 26. Each of spray nozzles 28 includes a spray outlet and is adapted to spray a cone 40 of fluid 24 through the spray outlet into tank 26.

As one skilled in the art will appreciate, each of spray nozzles 28 may include the same or different geometry and/or shape depending on the desired shape of cone 40 and the properties of fluid 24. Fluid 24 may be contained in a lower portion 41 of tank 26 and pumped to spray nozzles via a transfer line 42. Fluid 24, which reacts with gaseous pollutants in gas stream 22, generally consists of water and an absorbent dissolved or suspended therein or other solution known in the art.

Figure 3:
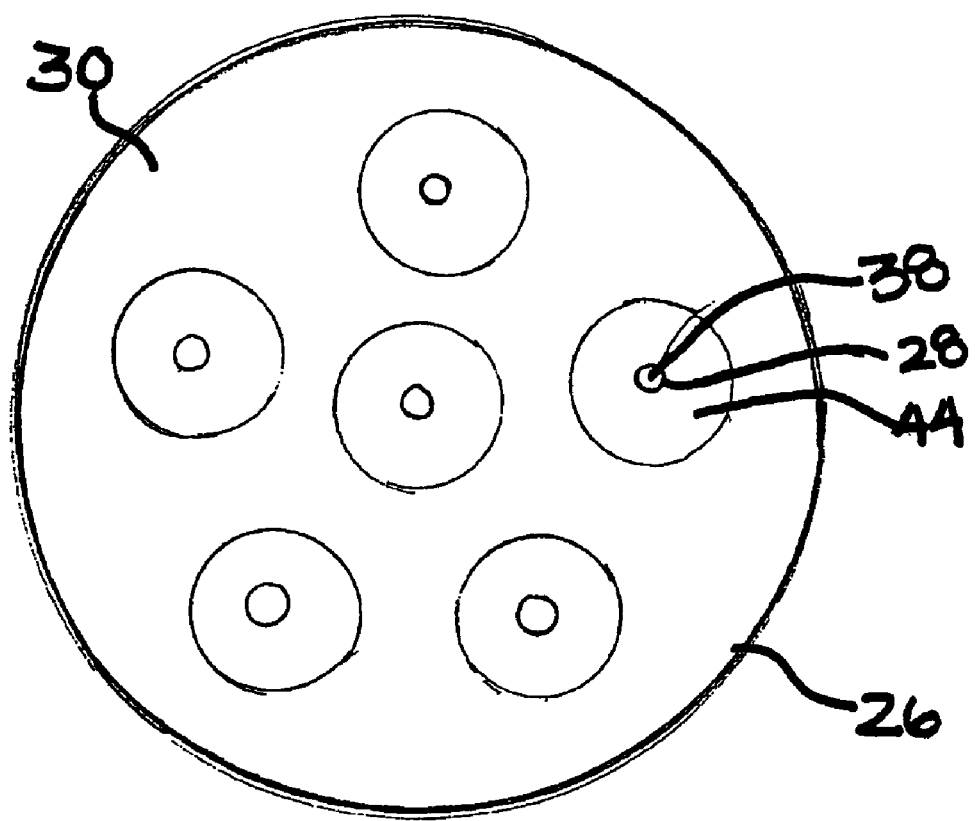
FIG. 3 is a cross-sectional view taken along line 3-3 in FIG. 1.

Referring now to FIG. 3, perforated plate 30 includes a plurality of perforations 44 and is positioned so that each one of the plurality of perforations is aligned with a spray outlet 38 of one or more of plurality of spray nozzles 28. Although it is not required that each one of plurality of perforations 44 be perfectly concentrically aligned with a spray outlet 38, typically the alignment should be sufficient to either direct gas stream 22 to flow into a denser portion of cone 40 or receive the gas stream after it has flowed through a cone that is upstream of the perforation, e.g., co-current flow of the gas stream and the fluid. As follows, it is also contemplated by the invention that where cone 40 is directed at an angle with respect to perforated plate 30 that the angled cone may be substantially out of concentrical alignment with a respective one of plurality of perforations 44. Each one of plurality of perforations 44 typically has a diameter 46 greater than a diameter 47 of cone 40 that is sprayed from the spray outlet to which it is aligned. Diameter 47 is at a portion of cone 40 located where the cone passes through one of plurality of perforations 44. Perforated plate 30 extends across an entire cross-section of tank 26 so that gas stream 22 must pass thru plurality of perforations 44. Although illustrated as round, the cross-section of each or a portion of plurality of perforations 44 may be any other shape. Generally, the cross-section of each or a portion of plurality of perforations 44 will be substantially similar to a cross-section of the cone 40 that passes through it.

Flow path 36 is typically vertically orientated with respect to a longitudinal axis A of tank 26. However, flow path 36 may also be horizontally oriented or angled with respect to longitudinal axis A of tank 26 depending on the orientation of spray nozzles 28 and perforated plate 30.

Figure 4:
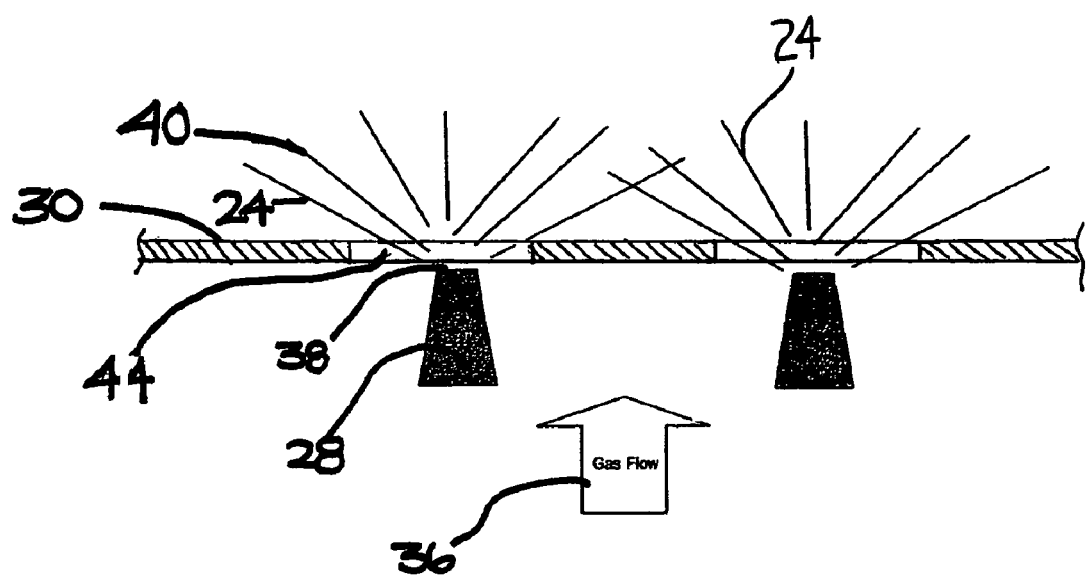
FIG. 4 is an enlarged partial cross-sectional view of one embodiment of the present invention.
Figure 5:
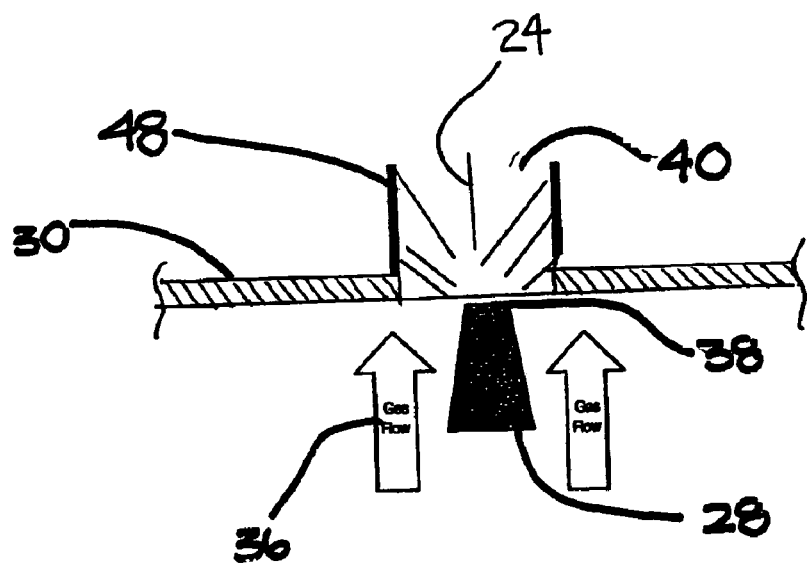
FIG. 5 is an enlarged partial cross-sectional view according to one embodiment of the present invention.
Figure 6:
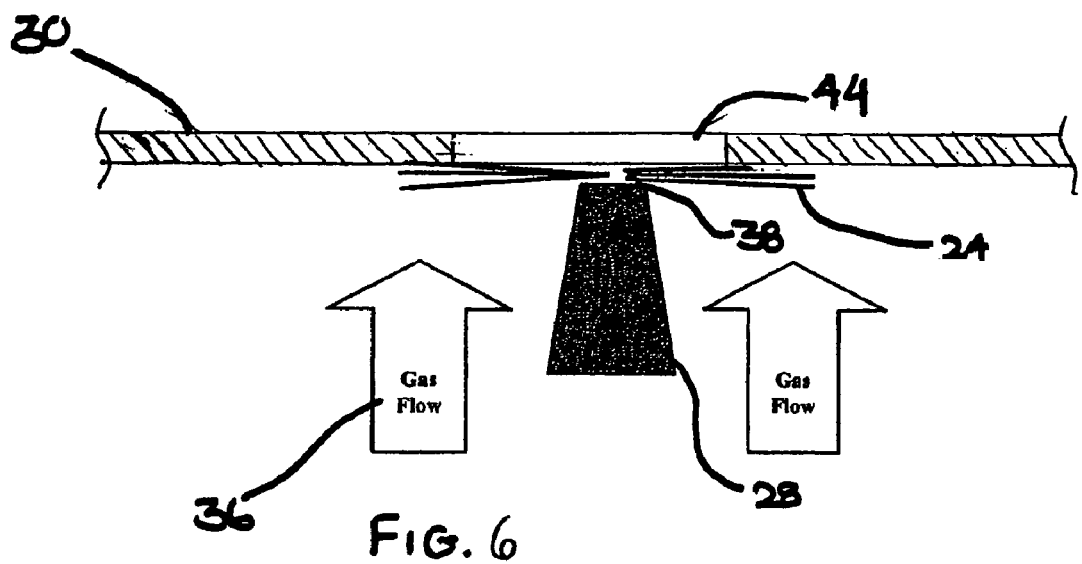
FIG. 6 is an enlarged partial cross-sectional view according to one embodiment of the present invention.
Figure 7:
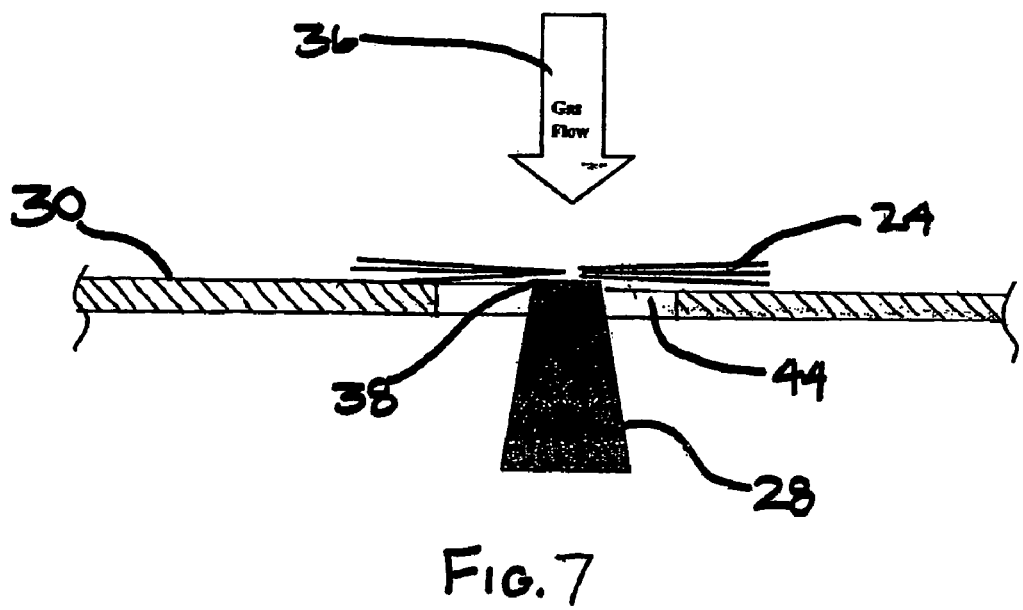
FIG. 7 is an enlarged partial cross-sectional view according to one embodiment of the present invention.

As illustrated in FIGS. 4-7, various flow directions, spray nozzle orientations, and perforated plate positions are contemplated by the present invention. Referring now to FIG. 4, as mentioned above, flow path 36 may flow in the same direction as cone 40 of fluid 24. Referring now to FIG. 5, in another embodiment, perforated plate 30 may include an extension sleeve 48. As illustrated, gas flow 36 is moving in the same direction as cone 40 of fluid 24. However, flow path 36 may also flow in a direction opposite that of cone 40. Referring now to FIGS. 6 and 7, in other embodiments, spray nozzles 28 may be adapted so that fluid 24 exits spray outlet with a 180° spray angle. Flow path 36 may flow in either the same direction or an opposite direction as fluid 24 exiting spray nozzle 28.

Figure 8:
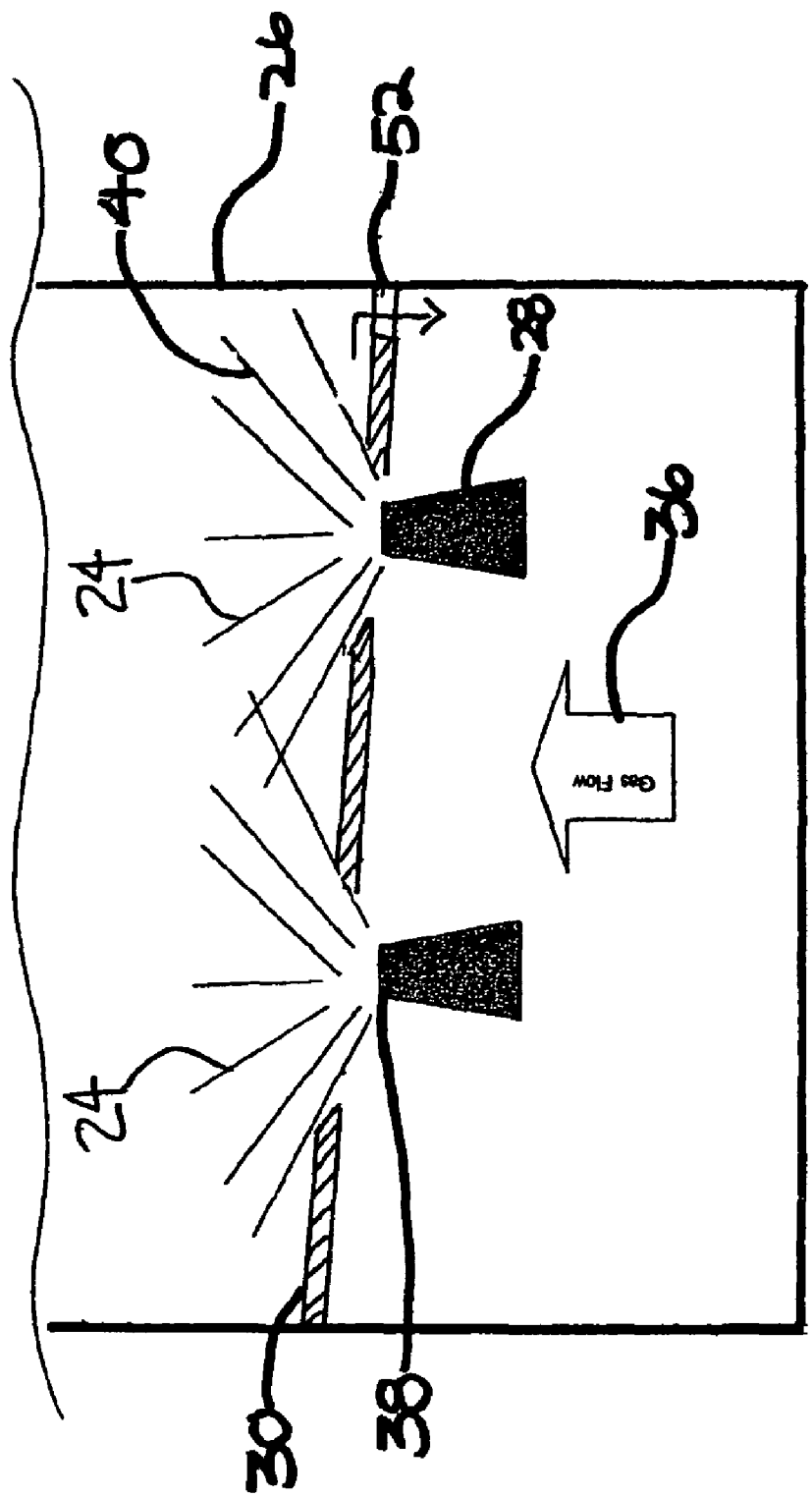
FIG. 8 is an enlarged partial cross-sectional view according to one embodiment of the present invention.

Referring now to FIG. 8, in one embodiment, perforated plate 30 may also be sloped and include a drain 60 to ensure drainage of fluid 24 so that build-up of solids in perforations 44 is reduced. Alternatively, as shown in FIG. 1, where perforated plate 30 creates a barrier for fluid 24 to pass through, a supplemental irrigation system 50 for preventing build-up of solids in perforations 44 may be implemented. Supplemental irrigation system 50 may include a valve 52 to stop the flow of fluid 24 to spray nozzles 28 and allow water, for example, to be run through transfer line 42. Running water through transfer line 42 and nozzles 28 will help clean any residue accumulated on perforated plate 30.

Another aspect of the invention is a method of improving contact between a gas stream and a fluid. In operation, gas stream 22 enters tank 26 through inlet 32. Gas stream 22 travels in flow path 36 throughout tank 26. In FIG. 1, flow path 36 is in a vertical direction, but can be in any direction in other embodiments. As gas stream 22 travels through tank 26, it encounters perforated tray 30. Next, gas stream 22 is forced to pass through plurality of perforations 44. Above perforated plate 30 is a plurality of spray nozzles 28 adapted to spray a cone 40 of fluid 24 in a direction opposite of flow path 36. In another embodiment, gas flow 36 is co-current with cone 40 of fluid 24.

Each one of plurality of spray nozzles 28 is concentrically aligned with one of plurality of perforations 44. As gas stream 22 passes through plurality of perforations 44, it comes into direct contact with cone 40 of fluid 24 at its densest part. As gas stream 22 and fluid 24 contact one another, a reaction occurs. Small droplets of liquid are formed and fall through perforation 44 to the bottom of tank 26. The remaining treated gas stream 22 exits tank 26 and is typically exhausted to the atmosphere through an outlet 34.

A spray tower according to the present invention offers advantages over prior art designs in that maldistribution and stratification is minimized by forcing all the gas through perforations into the cone of the spray nozzles.

The present invention can be designed in the production of new spray towers. This invention will reduce the number of spray nozzles needed because the equal spacing of spray nozzles to cover the cross-sectional area is no longer needed. The nozzles can be arranged in a cost-effective and supportive manner.

Additionally, the present invention is suited existing spray towers. A perforated plate can be customized to fit any existing spray tower with any design. The invention can be adapted to accommodate any design of spray tower.

With higher transfer and minimized maldistribution, liquid/gas ratios will be lower, thereby no longer requiring various levels of sprayers. With only a single layer of sprayers, the spray tower can be designed to be shorter.

Although the invention has been described and illustrated with respect to exemplary embodiments thereof, it should be understood by those skilled in the art that the foregoing and various other changes, omissions and additions may be made therein and thereto, without parting from the spirit and scope of the present invention. Accordingly, other embodiments are within the scope of the following claims.

What is claimed is:

1. A spray tower for improving contact between a gas stream and a fluid, said spray tower comprising:
   a tank including an inlet and an outlet, said gas stream flowing between said inlet and said outlet along a flow path and in a main direction;
   a plurality of spray nozzles positioned in said tank, each of said plurality of spray nozzles including a spray outlet, wherein each of said plurality of spray nozzles is adapted to spray a cone of said fluid through said spray outlet into said tank; and
   a perforated plate having a plurality of perforations, said perforations consisting of apertures in said perforated plate and not having any raised surfaces with respect to other portions of said perforated plate, wherein said perforated plate is positioned in said tank so as to define a cross-section of said tank and said perforated plate is positioned so that each of said plurality of perforations is downstream of and aligned with said cone flowing from said spray outlet of one of said plurality of spray nozzles, said perforated plate being positioned closer to said inlet than said spray outlets.

2. A spray tower according to claim 1, wherein each of said plurality of perforations has a diameter greater than a diameter of said cone from said spray outlet of said one of said plurality of spray nozzles, wherein said diameter of said cone is located where said cone passes through one of said plurality of perforations.

3. A spray tower according to claim 1, wherein said flow path is one of vertically orientated with respect to a longitudinal axis of said tank, horizontally oriented with respect to a longitudinal axis of said tank, and angled with respect to a longitudinal axis of said tank.

4. A spray tower according to claim 1, further comprising:
a supplemental irrigation system for preventing build-up of solids in said plurality of perforations.

5. A spray tower according to claim 1, wherein said perforated plate is sloped and includes a drain to ensure drainage of said fluid so that build-up of solids in said plurality of perforations is reduced.

6. A perforated plate for improving contact between a gas stream and a fluid flowing in a spray tower, said spray tower including a tank and spray nozzles for distributing a cone of said fluid, said perforated plate comprising:
a plate adapted to cover a cross-section of said spray tower, said plate having a plurality of perforations, said perforations consisting of apertures in said plate and not having any raised surfaces with respect to other portions of said plate, wherein each of said plurality of perforations is configured to be aligned with said cone flowing from one of said spray nozzles, said perforated plate being positioned closer to an inlet in said spray tower for said gas stream than said spray nozzles.

7. A perforated plate according to claim 6, wherein each of said plurality of perforations has a diameter greater than a diameter of said cone exiting said one of said spray nozzles where said cone passes through one of said plurality of perforations.

8. A method of improving contact between a gas stream and a fluid, said method comprising:
directing said gas stream into a tank via an inlet;
positioning a plurality of spray nozzles in said tank, each of said plurality of spray nozzles including a spray outlet, wherein each of said plurality of spray nozzles is adapted to spray a cone of said fluid through said spray outlet into said tank;
positioning a perforated plate having a plurality of perforations in said tank so that each of said plurality of perforations is downstream of and aligned with said cone flowing from said spray outlet of one of said plurality of spray nozzles, said plurality of perforations consisting of apertures in said perforated plate and not having any raised surfaces with respect to other portions of said perforated plate, said perforated plate being positioned closer to said inlet than said spray outlets; and
spraying said fluid through said plurality of spray nozzles and into said tank.

9. A method according to claim 8, wherein said gas stream passes through said plurality of perforations and comes into direct contact with said cone of said fluid.

\* \* \* \* \*